April 21, 1925.
H. G. FOWLER
1,534,376
PROCESSING HYDROCARBON LUBRICATING OILS
Filed Oct. 16, 1923
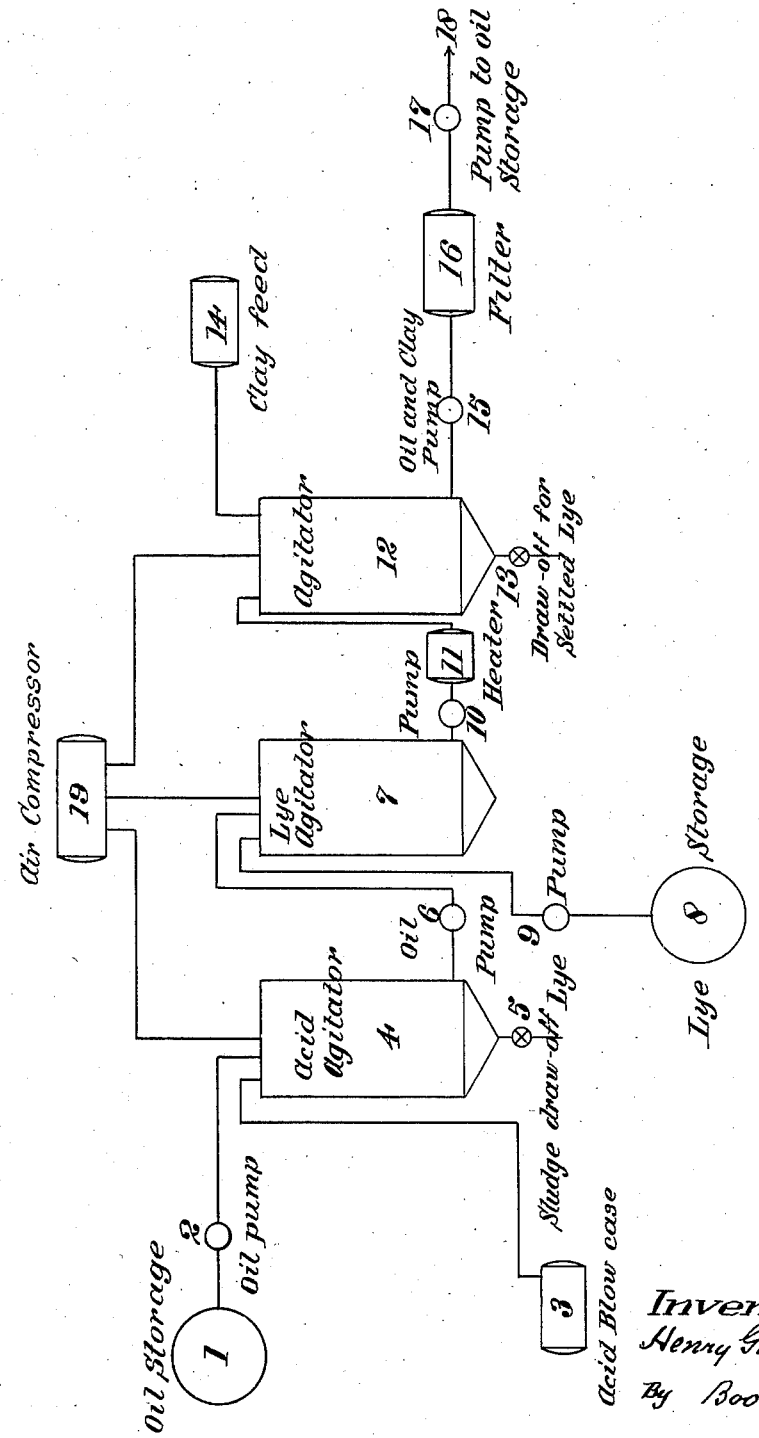
Inventor.
Henry Guy Fowler
By Booth & Booth
Attorneys.

Patented Apr. 21, 1925.

1,534,376

UNITED STATES PATENT OFFICE.

HENRY GUY FOWLER, OF ASSOCIATED, CALIFORNIA, ASSIGNOR TO ASSOCIATED OIL COMPANY, OF SAN FRANCISCO, CALIFORNIA, A CORPORATION OF CALIFORNIA.

PROCESSING HYDROCARBON LUBRICATING OILS.

Application filed October 16, 1923. Serial No. 668,817.

*To all whom it may concern:*

Be it known that I, HENRY GUY FOWLER, a citizen of the United States, residing at Associated, in the county of Contra Costa and State of California, have invented certain new and useful Improvements in Processing Hydrocarbon Lubricating Oils, of which the following is a specification.

My invention relates, in general, to the refining of hydrocarbon lubricating oils, and in particular to the processing thereof comprising the initial acid treatment, the succeeding alkali treatment and the final or finishing decolorizing step.

The object of my invention is to save time in processes of this nature. This object together with the improvements by which it is realized with hereinafter fully appear. A brief statement of the prevailing practise will be of service in order that comparison may be made and the essential novelty of my process thereby clearly pointed out.

The procedure customarily followed in processing hydrocarbon lubricating oil is to transfer the oil to be treated to an agitator. Sulfuric acid is added in one or more charges, each charge being agitated with air. The agitator content separates into two layers, the acid sludge below and the oil on top. When the sludge is settled, it is drawn off. If more than one charge of acid is used, a very small amount of water is added towards the end of the agitation as this tends to coagulate the acid and sludge, causing the acid sludge to settle more rapidly. When the sludge and excess acid have been removed from the agitator, the oil from which they separated is then transferred to another agitator. Herein an alkaline agent such as a compound of potassium, calcium or soda, preferably, and in general practise caustic soda is added to neutralize the acid still remaining in the oil and to further separate out undersirable compounds. Sufficient alkali is added and the total mass of oil and alkali is agitated until a sample of the oil taken from the top of the agitator shows an alkaline reaction.

The mixture is then allowed to stand for the lye to settle. This usually takes from twelve to thirty hours depending on the condition and viscosity of the oil. Also at this point it is customary to slightly heat the oil in the agitator by means of a steam coil, the average temperature used varying from 90° to 140° Fahr., depending on the viscosity of the oils. The settling and relatively slight heating at this point result in separating out a certain portion of the lye, but after this has been drawn off there still remains so much lye that it is found necessary to spray the oil with large quantities of water in order to wash out the remaining lye. During washing the oil is slightly agitated, and the washing has to be repeated, in some cases as many as seven times requiring as long as ten days, it being seldom that the oil is washed under three days. Many times troublesome emulsions are encountered which occasionally compel the operator to either slop the oil or re-run it in a still.

After thus washing the oil it is transferred to a shallow bleaching tank, heated, and air blown through the mass to remove the moisture.

Thus, it will be seen, a long time is required to finish the oil made alkaline following the initial acid treatment, and it requires washing with large quantities of water. As is well known, the addition of an alkali to a hydrocarbon lubricating oil after acid treatment, forms a mixture requiring careful handling, to prevent the oil and alkali from forming an emulsion, especially with oils having a viscosity of 400 or over (Saybolt) at 100° Fahr., also large quantities of water must be used over a long period of time to remove the alkali. My improvement may now be described.

In carrying out my process the oil is successively treated with acid and with alkali in the same general way as outlined above for the regular or common practise, that is to say, up to the time when the oil shows an alkaline reaction. When, by the reaction test it is shown that an alkali has been added to the oil in excess of that required to neutralize the acid present, the alkali and oil mixture, instead of being allowed to stand, is quickly heated either by a steam coil in the lye agitator, or by an exterior heater through which the mixture is passed and returned to the agitator or delivered, if preferred, to another agitator. The temperature to which, in this step of my process, the alkali and oil mixture is rapidly raised is the essential feature of my method and it may be described in general terms as a temperature sufficient or adapted to effect of itself and without any washing the rapid deposition of approximately all the alkali in the mixture. In practise, and as an example of this necessary temperature, I find that a range between 150° and 250° Fahr., depending on the grade and viscosity of the oil being treated, is sufficient for the purpose. Under this temperature approximately all the alkali rapidly settles, that is, in a few hours, and is then removed. I find that this rapid application of heat within the range given as an example, accelerates the separation of the alkali, by reason of taking advantage of the extreme difference in the co-efficient of expansion between an alkali solution and a hydrocarbon oil. Moreover, the rapidity of this heat application has little effect on the quality or appearance of the oil, as would be the case if heat were applied more slowly and over an appreciable length of time. Also if heated slowly there is a tendency for the alkali to react chemically with certain unsaturated and sulfonated hydrocarbons, which reaction renders the oil more difficult to process. As the bleaching step of my process, the oil from which all but a very slight remainder of the alkali has been effectually and quickly separated by the stated heating without any washing whatsoever, and while said oil is still in a slightly alkaline condition, is then treated with a decolorizing agent which may be bone ash, animal char, fuller's earth or as is preferred a natural aluminum silicate or filtering clay, at a temperature ranging from 200° to 300° Fahr., for from ten to forty-five minutes. The next step is to filter the clay out by usual methods and means, producing a finished, brilliantly clear oil neutral in reaction. The final step is to cool the finished oil by suitable means.

During the entire process, all troublesome emulsions are avoided, and instead of taking from three to ten days to settle and wash out the lye, the oil is finished in a few hours without the use of water. In the old method commonly employed where water is used to remove all or all but a trace of the alkali, the washed oil is removed to tanks or bleachers, heated to a temperature from 90° to 140° Fahr., and air blown through the mass to remove the moisture. The air thus applied affects the color and general appearance of the oil and tends to oxidize any unsaturated hydrocarbons present.

These disadvantages are obviated by my method and certain new advantages are secured, by eliminating the use of water for washing, and treating the oil while still slightly alkaline with a finely divided natural aluminum silicate or filtering clay, at the temperature stated. In the accompanying drawing the figure shows diagrammatically one form of apparatus in which my process may be carried out. 1 is a storage vessel for the untreated oil. 2 is a pump in the line for conveying said oil to the agitator 4. 3 is an acid blow-case from which under air pressure acid is forced through the line into the agitator 4. 5 is a draw-off for the sludge or lower layer formed in the agitator 4. 6 is a pump for transferring the acid treated oil through the line into the lye agitator 7. 8 is the lye storage vessel, from which a pump 9 transfers the lye to the agitator 7. 10 is pump to transfer the lye and oil mixture to and through a heater 11 whereby the temperature of the mixture is quickly raised to the required degree as described, the heated mixture passing into an agitator 12 in which the lye quickly settles out and is removed through a draw off line 13. 14 is a clay-feed to the agitator 12. 15 is a pump to transfer oil and clay to filter 16. 17 is a pump to transfer the finished oil to a storage 18. 19 is an air compressor supplying air to agitators 4, 7 and 12.

I claim:

1. The process of treating hydrocarbon lubricating oils comprising initially treating the oil with sulphuric acid; then treating said acid-treated oil with alkali; then rapidly settling out from the alkali-treated oil approximately all the alkali solely by quickly heating the oil; then treating the oil with a decolorizing agent; and finally separating said decolorizing agent from the oil.

2. The process of treating hydrocarbon lubricating oils comprising initially treating the oil with sulphuric acid; then treating said acid-treated oil with alkali; then rapidly settling out from said alkali-treated oil approximately all the alkali solely by quickly raising said alkali-treated oil to a temperature ranging between 150° and 250° Fahr.; then treating the oil with a decolorizing agent; and finally separating said decolorizing agent from the oil.

3. The process of treating hydrocarbon lubricating oils comprising initially treating the oil with sulphuric acid; then treating said acid-treated oil with alkali; then rapidly settling out from the alkali-treated oil approximately all the alkali solely by quickly heating the oil; then treating the oil with a decolorizing agent under a temperature ranging between 200° and 300° Fahr.; and finally separating said decolorizing agent from the oil.

4. The process of treating hydrocarbon lubricating oils comprising initially treating the oil with sulphuric acid; then treating said acid-treating oil with alkali; then rapidly settling out from said alkali-treated oil approximately all the alkali solely by quickly raising said alkali-treated oil to a temperature ranging between 150° and 250° Fahr., then treating the oil with a decolorizing agent under a temperature ranging between 200° and 300° Fahr.; and finally separating said decolorizing agent from the oil.

In testimony whereof I have signed my name to this specification.

HENRY GUY FOWLER.